United States Patent
Miyoshi (10) Patent No.: US 9,104,818 B2
(45) Date of Patent: Aug. 11, 2015

(54) ACCELERATOR MANAGEMENT DEVICE, ACCELERATOR MANAGEMENT METHOD, AND INPUT-OUTPUT DEVICE

(71) Applicant: FUJITSU LIMITED, Kawasaki-shi (JP)

(72) Inventor: Takashi Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 371 days.

(21) Appl. No.: 13/714,479

(22) Filed: Dec. 14, 2012

(65) Prior Publication Data

US 2013/0246679 A1    Sep. 19, 2013

(30) Foreign Application Priority Data

Mar. 16, 2012  (JP) ................................. 2012-061194

(51) Int. Cl.
  *G06F 13/40* (2006.01)
  *G06F 1/18* (2006.01)
(52) U.S. Cl.
  CPC ................ *G06F 13/40* (2013.01); *G06F 1/185* (2013.01)
(58) Field of Classification Search
  CPC ................................. G06F 1/185; G06F 13/40
  USPC .................... 710/300, 301, 313, 316
  See application file for complete search history.

(56) References Cited

U.S. PATENT DOCUMENTS

| 4,564,903 | A   |   | 1/1986  | Guyette et al. |
|-----------|-----|---|---------|----------------|
| 6,510,469 | B1  | * | 1/2003  | Starnes et al. ................ 709/247 |
| 7,299,342 | B2  |   | 11/2007 | Nilsson et al. |
| 7,415,595 | B2  |   | 8/2008  | Tell et al. |
| 7,457,906 | B2  |   | 11/2008 | Pettey et al. |
| 2010/0228900 | A1 | * | 9/2010 | Wheeler et al. ............... 710/300 |

FOREIGN PATENT DOCUMENTS

| JP | 60-83168       | 5/1985 |
| JP | 2008-546072    | 12/2008 |
| WO | WO-2006/126943 | 11/2006 |

* cited by examiner

*Primary Examiner* — Glenn A Auve
(74) *Attorney, Agent, or Firm* — Fujitsu Patent Center (57) ABSTRACT

An accelerator management device includes an accelerator link DB that stores an accelerator identifier in association with an application identifier. The accelerator management device includes the accelerator mounting information DB that stores the accelerator identifier of an accelerator mounted in a slot in association with each slot identifier used to identify each slot of an expansion I/O box. The accelerator management device specifies an accelerator identifier corresponding to an application by referring to the accelerator link DB when an execution request of an application is received from a host. The accelerator management device specifies a slot identifier corresponding to the specified accelerator identifier by referring to the accelerator mounting information DB. The accelerator management device assigns the slot that is identified through the slot identifier which is specified by the second specifying unit to the host.

7 Claims, 8 Drawing Sheets

ACCELERATOR MANAGEMENT DEVICE, ACCELERATOR MANAGEMENT METHOD, AND INPUT-OUTPUT DEVICE

CROSS-REFERENCE TO RELATED APPLICATION

This application is based upon and claims the benefit of priority of the prior Japanese Patent Application No. 2012-061194, filed on Mar. 16, 2012, the entire contents of which are incorporated herein by reference.

FIELD

The embodiment discussed herein is directed to an accelerator management device, an accelerator management method, and an input-output device.

BACKGROUND

In the past, a processing function has been known to be improved using a graphics processing unit (GPU), a field-programmable gate array (FPGA), or the like as an accelerator. An accelerator such as a GPU is expected to improve a performance of a specific application. Further, there are a wide variety of accelerators.

Generally, a processing performance is improved by mounting an accelerator used by an application to be executed in each host that executes an application. In this technique, since a central processing unit (CPU) of a host is connected with an accelerator in a one-to-one manner, when the CPU is broken, it is difficult to use the accelerator, and thus use efficiency of the accelerator is low. In recent years, a plurality of accelerators are mounted in an expansion I/O box of a PCI Express or the like, and a plurality of hosts use the accelerators via the expansion I/O box.

Patent Literature 1: Japanese National Publication of International Patent Application No. 2008-546072

Patent Literature 2: Japanese Laid-open Patent Publication No. 60-083168

Patent Literature 3: U.S. Patent No. 2004/0172494

However, the relation arts have a problem in that it is difficult to flexibly change an accelerator to be used by a host.

For example, when an expansion I/O box of a PCI Express is used, a relation between a slot position of the expansion I/O box and a host is statically fixed. In other words, a host is associated with a slot in a one-to-one manner.

For this reason, in order to cause a host A using an accelerator A of a slot A to use another accelerator, the accelerator A mounted in the slot A is first pulled out, and then a desired new accelerator is manually mounted in the slot A. Then, processing such as rebooting is executed on the host A, and so the new accelerator is recognized. Further, when a correspondence of the host A is changed to a slot B, the host A is first shut down, and then switching control of the expansion I/O box is changed from a management server. As described above, since a relation between the host and the slot of the expansion I/O box is statically fixed, it is difficult to flexibly change an accelerator on a host.

SUMMARY

According to an aspect of an embodiment, a accelerator management device, includes: a first storage unit that stores an accelerator identifier used to identify an accelerator used by an application in association with an application identifier used to identify the application; a second storage unit that stores the accelerator identifier of the accelerator mounted in a slot in association with a slot identifier used to identify each slot of an expansion box in which a plurality of accelerators are mounted; a first specifying unit that specifies an accelerator identifier corresponding to an application by referring to the first storage unit when an execution request of the application is received from a host; a second specifying unit that specifies a slot identifier corresponding to the accelerator identifier specified by the first specifying unit by referring to the second storage unit; and an assignment control unit that assigns the slot that is identified through the slot identifier which is specified by the second specifying unit to the host.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The present invention is not limited to the following embodiments.

[a] First Embodiment

Overall Configuration

Figure 1:
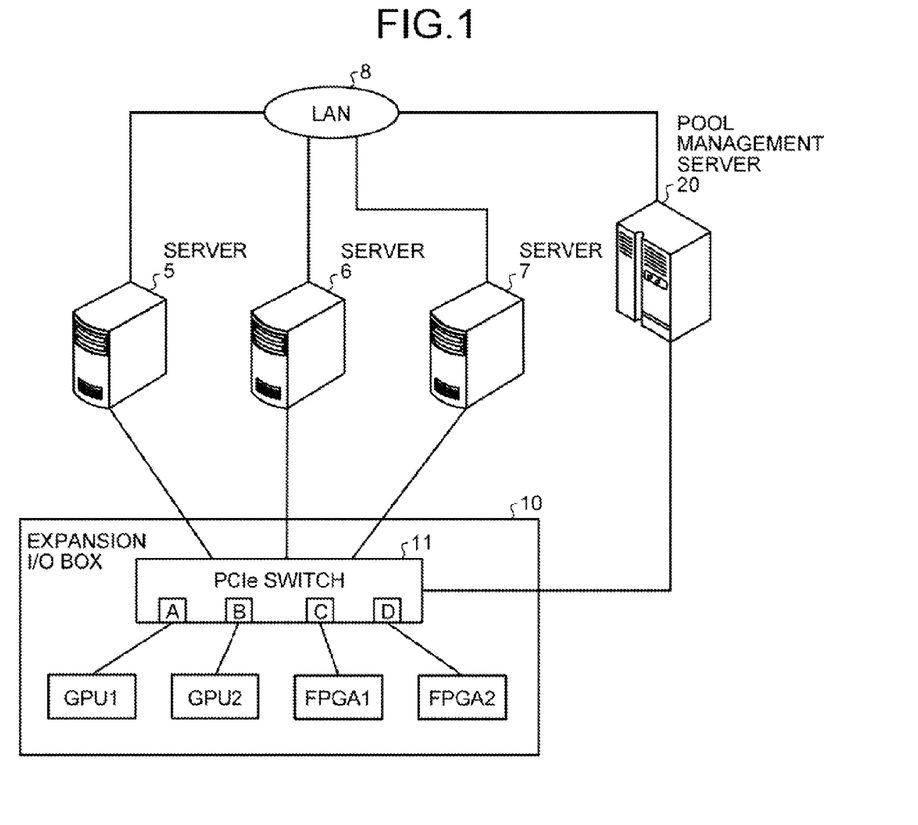
FIG. 1 is a diagram illustrating an overall configuration example of a system according to a first embodiment.

FIG. 1 is a diagram illustrating an overall configuration example of a system according to a first embodiment. As illustrated in FIG. 1, the system includes a server 5, a server 6, a server 7, a pool management server 20, and an expansion I/O box 10.

The server 5, the server 6, and the server 7 are devices that include at least one processor such as a CPU and execute an application. Each server is connected with the expansion I/O box 10 via the PCI Express (which may be hereinafter referred to as a "PCIe"). Further, each server is connected with the pool management server 20 via a network such as a local area network (LAN) 8. Each server is a device that corresponds to a hot plug.

The expansion I/O box 10 is a device that includes a PCIe switch 11 and a plurality of accelerators. For example, the PCIe switch 11 is a switching circuit that includes a slot used to accommodate an accelerator and connects each server with a slot. The PCIe switch 11 is connected with each server and each pool management server 20 via the PCIe.

The first embodiment will be described in connection with an example in which the PCIe switch 11 has four slots of slots A, B, C, and D, and an accelerator is mounted in each slot. A GPU1 is mounted in the slot A, a GPU2 is mounted in the slot B, an FPGA1 is mounted in the slot C, and an FPGA2 is mounted in the slot D. This is merely an example, and the number of slots or the type of accelerator is not limited. For example, a flash memory storing a program, a device having a CPU core, or the like may be used as the accelerator.

The pool management server 20 is a management device that generates a pool of accelerators so that the accelerators can be shared by a plurality of servers. Specifically, the pool management server 20 stores an accelerator identifier used to identify an accelerator used by an application in association with an application identifier used to identify an application. In addition, the pool management server 20 stores an accelerator identifier of an accelerator mounted in a slot in association with each slot identifier used to identify each slot of the expansion I/O box 10. Further, when an execution request of an application is received from a certain server, the pool management server 20 specifies an accelerator identifier corresponding to the application. Furthermore, the pool management server 20 specifies a slot identifier corresponding to the specified accelerator identifier. Thereafter, the pool management server 20 assigns a slot identified by the specified slot identifier to a server that has requested execution of the application.

As described above, the pool management server 20 holds a link between a slot and an accelerator of the expansion I/O box 10 and a link between an application and an accelerator. Further, the pool management server 20 automatically assigns an accelerator to be used by an application to a server that is to execute the application. As a result, it is possible to flexibly change an accelerator to be used by a server.

Configuration of Pool Management Server

Next, a configuration of the pool management server 20 will be described. The server illustrated in FIG. 1 has the same configuration as a general server, and the expansion I/O box 10 has the same configuration as a general expansion I/O box, and thus a description thereof will not be made.

Figure 2:
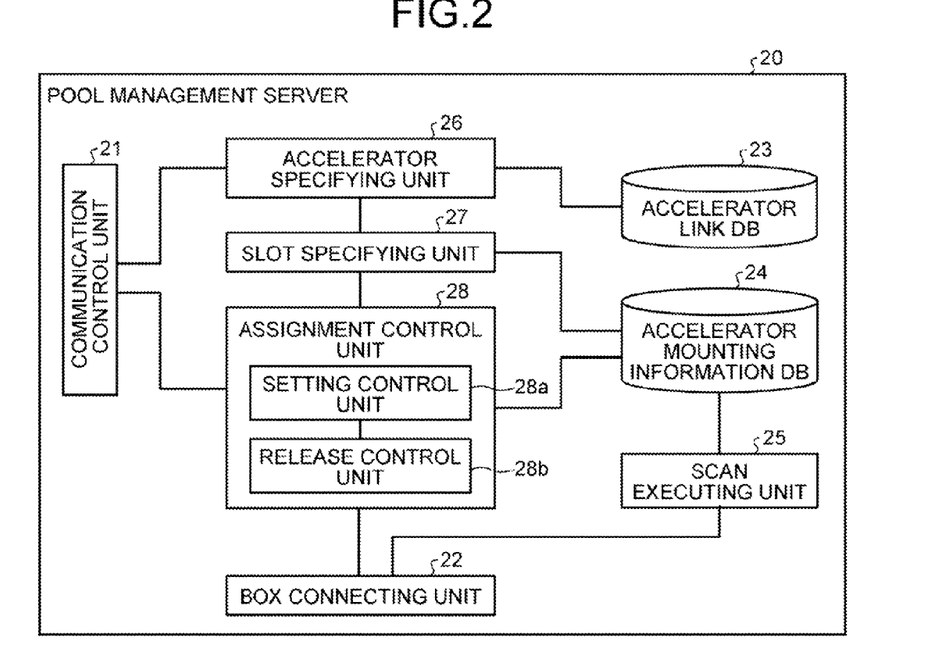
FIG. 2 is a functional block diagram illustrating a configuration of a pool management server.

FIG. 2 is a functional block diagram illustrating a configuration of the pool management server. As illustrated in FIG. 2, the pool management server 20 includes a communication control unit 21, a box connecting unit 22, an accelerator link DB 23, an accelerator mounting information DB 24, a scan executing unit 25, an accelerator specifying unit 26, a slot specifying unit 27, and an assignment control unit 28. The pool management server 20 may be built in the expansion I/O box 10.

The accelerator link DB 23 and the accelerator mounting information DB 24 are disposed in a storage device such as a memory. The scan executing unit 25, the accelerator specifying unit 26, the slot specifying unit 27, the assignment control unit 28 are processing units which are executed by a processor such as a CPU.

The communication control unit 21 is a processing unit that controls communication with each server. For example, the communication control unit 21 receives an application execution request or an application end notice from the server 5. Further, the communication control unit 21 transmits an application execution instruction to the server 5.

The box connecting unit 22 is a processing unit that controls communication with the expansion I/O box 10. For example, the box connecting unit 22 transmits a switch setting change instruction, a scan instruction to scan each slot of the expansion I/O box 10, a transition instruction to a power saving mode, a recover instruction from the power saving mode, or the like to the expansion I/O box 10. Further, the box connecting unit 22 receives a scan result or the like.

Figure 3:
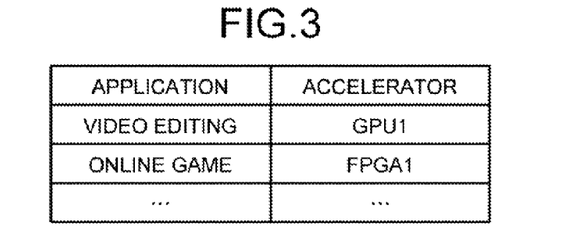
FIG. 3 is a diagram illustrating an example of information stored in an accelerator link DB.

The accelerator link DB 23 stores an accelerator identifier used to identify an accelerator used by an application in association with an application identifier used to identify the application. FIG. 3 is a diagram illustrating an example of information stored in the accelerator link DB. As illustrated in FIG. 3, the accelerator link DB 23 stores a correspondence of "application, accelerator."

The "application" stored here refers to an application identifier used to identify an application, and for example, a name of an application is set as the "application." The "accelerator" refers to an accelerator identifier used to identify an accelerator used by an application, and for example, a name of an accelerator is set as the "accelerator." For example, FIG. 3 illustrates that an application for executing video editing can use the GPU1 as an accelerator. Similarly, an application for executing an online game can use the FPGA1 as an accelerator. The stored information is updated by an administrator or the like.

Figure 4:
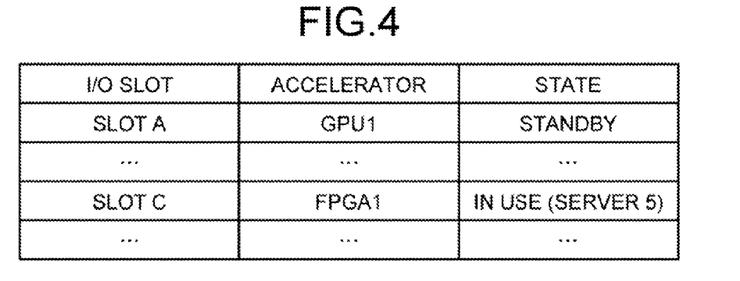
FIG. 4 is a diagram illustrating an example of information stored in an accelerator mounting information DB.

The accelerator mounting information DB 24 stores an accelerator identifier of an accelerator mounted in an each slot in association with each slot identifier used to identify each slot of the expansion I/O box 10. FIG. 4 is a diagram illustrating an example of information stored in the accelerator mounting information DB. As illustrated in FIG. 4, the accelerator mounting information DB 24 stores a correspondence of "I/O slot, accelerator, state."

The "I/O slot" stored here refers to an identifier used to identify a slot of the expansion I/O box 10, and for example, a name of a slot is set as the "I/O slot." The "accelerator" refers to an accelerator identifier used to identify an accelerator used by an application, and for example, a name of an accelerator is set as the "accelerator." For example, FIG. 4 illustrates that the GPU1 is mounted in the slot A, the GPU1 is not current used by an application and in a standby state. Similarly, the FPGA1 is mounted in the slot C, and the FPGA1 is currently being used by an application executed by the server 5. The stored information is updated by the scan executing unit 25.

The scan executing unit 25 is a processing unit that scans each slot of the expansion I/O box 10 and specifies an accelerator mounted in each slot. For example, the scan executing unit 25 scans each slot, collects a name of an accelerator mounted in each slot, and stores a slot identifier and a name of an accelerator in the accelerator mounting information DB 24 in association with each other.

Further, the scan executing unit 25 executes the scan operation and updates the accelerator mounting information DB 24 at regular intervals. Through the above-described operation, the scan executing unit 25 can specify the newly added accelerator. In addition, the scan executing unit 25 can follow a change in an accelerator mounted in a slot or the like.

The accelerator specifying unit 26 is a processing unit that specifies an accelerator identifier corresponding to an application based on the accelerator link DB 23 when an application execution request is received from a certain server. Specifically, the accelerator specifying unit 26 specifies an accelerator which can be used by an executed application.

For example, when an application for video editing is executed from the server 5, the accelerator specifying unit 26 specifies the GPU1 as an accelerator associated with video editing with reference to the accelerator link DB 23. Then, the accelerator specifying unit 26 notifies the slot specifying unit 27 of the specified GPU1. In addition, when there is no accelerator identifier corresponding to an application which is requested to be executed, the accelerator specifying unit 26 instructs the server 5 to execute the application without assigning an accelerator.

The slot specifying unit 27 is a processing unit that specifies a slot identifier corresponding to an accelerator identifier specified by the accelerator specifying unit 26 based on the accelerator mounting information DB 24. Specifically, the slot specifying unit 27 specifies a mounting position of an accelerator used by an application.

For example, upon being notified of the GPU1 from the accelerator specifying unit 26, the slot specifying unit 27 specifies an I/O slot associated with the notified GPU1 with reference to the accelerator mounting information DB 24. At this time, the slot specifying unit 27 specifies an I/O slot which is in a standby state. Here, when all of the specified I/O slots are in an in use state, the slot specifying unit 27 is on standby until any one of the I/O slots enters the standby state. For example, the slot specifying unit 27 notifies the assignment control unit 28 of the slot A as the specified I/O slot.

The assignment control unit 28 includes a setting control unit 28a and a release control unit 28b, and is a processing unit that assigns an accelerator to an application and releases an assignment of an accelerator to an application.

The setting control unit 28a is a processing unit that assigns a slot that the slot specifying unit 27 has identified by the specified slot identifier to the server 5 that has requested execution of an application. In case of the above example, the setting control unit 28a outputs an instruction to associate the slot A notified from the slot specifying unit 27 with the server 5 that has requested execution of an application to the PCIe switch 11. The PCIe switch 11 that has received this instruction changes a setting of a switching circuit or the like, and connects the slot A with the server 5.

In addition, the setting control unit 28a generates an interrupt for a recognition process of causing a processor of the server 5, to which the slot A is assigned, to recognize an accelerator mounted in the slot A. Specifically, the setting control unit 28a causes HotAdd to be executed by generating an interrupt on an unused processor among processors of the server 5. Thereafter, the setting control unit 28a transmits an application execution instruction to the server 5 via a LAN 8. As a result, the server 5 can be connected to the GPU1 mounted in the slot A of the PCIe switch 11 and execute an application using the GPU1.

In addition, when an assignment of an accelerator to the server 5 is completed, the setting control unit 28a updates the accelerator mounting information DB 24. Specifically, the setting control unit 28a changes the state of the accelerator mounted in the slot A assigned to the server 5 from the "standby" state to the "in use (the server 5)" state. In addition, the setting control unit 28a causes the fact that the "slot A" is assigned to the application "video editing" of the server 5 to be held in a memory or the like.

Referring back to FIG. 2, the release control unit 28b is a processing unit that release an accelerator used by an application when execution of the application ends. For example, when a notice representing the fact that "video editing" has ended is received from the server 5, the release control unit 28b specifies that the slot assigned to "video editing" is the slot A with reference to a memory or the like.

Then, the release control unit 28b generates an interrupt for a release process of releasing a use of the accelerator and outputs the interrupt to the processor of the server 5 that executes "video editing." Specifically, the release control unit 28b executes HotRemove by outputting the interrupt to the processor that is executing "video editing." As a result, the server 5 release the use of the GPU1 mounted in the slot A of the PCIe switch 11.

Here, when an assignment of an accelerator to the server 5 is released, the release control unit 28b updates the accelerator mounting information DB 24. Specifically, the release control unit 28b changes the state of the accelerator of the slot A assigned to the server 5 from "in use (the server 5)" state to "standby" state.

In addition, the release control unit 28b outputs an instruction to release a correspondence between the server 5 and the slot A to the PCIe switch 11. The PCIe switch 11 that has received this instruction changes the setting of the switching circuit, and release a connection between the slot A and the server 5.

Accelerator Assignment Process

Next, an accelerator assignment process will be described with reference to FIGS. 5 and 6. Here, the flow of a process will be described using a flowchart and a system configuration diagram.

Flowchart

Figure 5:
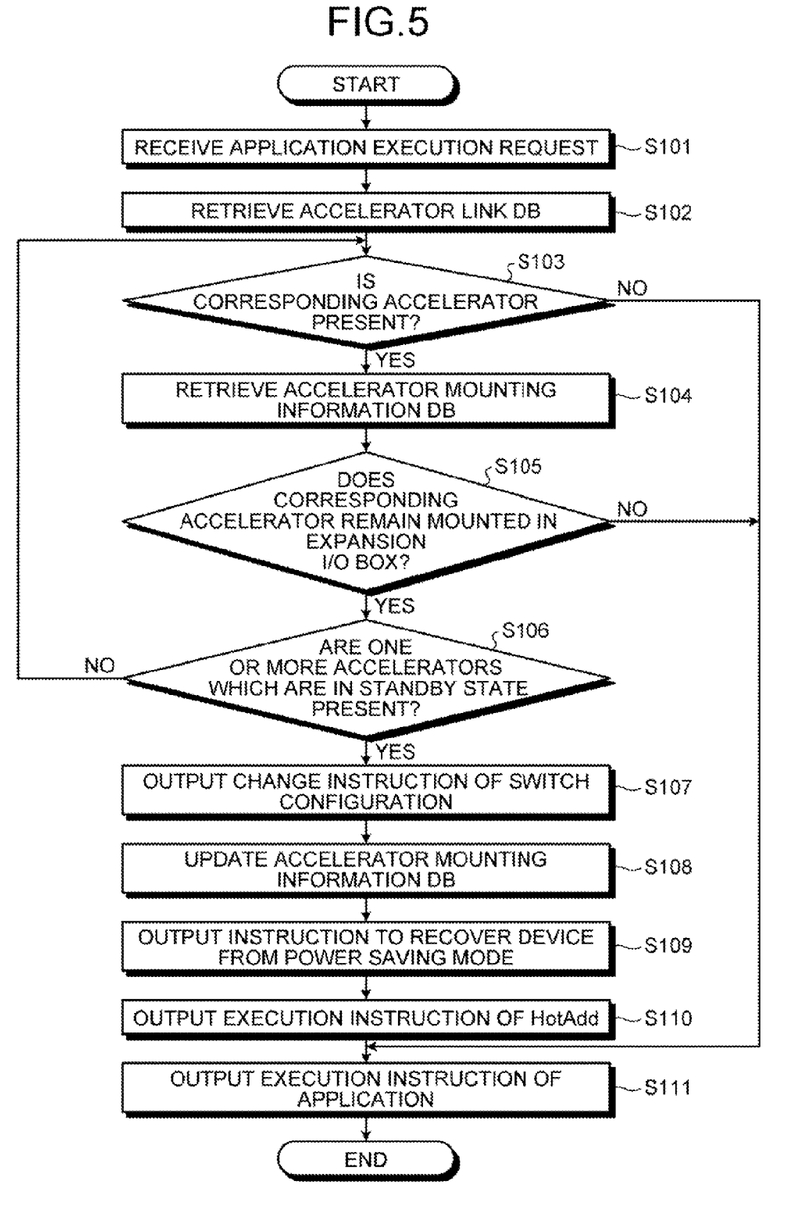
FIG. 5 is a flowchart illustrating the flow of an accelerator assignment process.

FIG. 5 is a flowchart illustrating the flow of an accelerator assignment process. As illustrated in FIG. 5, the setting control unit 28a of the pool management server 20 receives an application execution request from a server (S101). Then, the setting control unit 28a retrieves the accelerator link DB 23 (S102), and determines whether or not there is an accelerator corresponding to an application (S103).

Here, when it is determined that there is an accelerator corresponding to an application (Yes in S103), the setting control unit 28a retrieves the accelerator mounting information DB 24 (S104), and determines whether or not the corresponding accelerator remains mounted in the expansion I/O box 10 (S105).

Here, when it is determined that the corresponding accelerator remains mounted in the expansion I/O box 10 (Yes in S105), the setting control unit 28a executes step S106 with reference to the accelerator mounting information DB 24. In other words, the setting control unit 28a determines whether or not one or more accelerators which are in the standby state are present among the corresponding accelerators.

Then, when it is determined that one or more accelerators which are in the standby state are present among the corresponding accelerators (Yes in S106), the setting control unit 28a executes step S107. In other words, the setting control unit 28a specifies one of the accelerators which are in the standby state, and specifies a slot in which the specified accelerator is mounted from the accelerator mounting information DB 24. Then, the setting control unit 28a outputs an instruction to change a configuration of a switch to the expansion I/O box 10 so that the specified slot can be connected with the server that has requested execution of the application.

Thereafter, the setting control unit 28a updates the accelerator mounting information DB 24 (S108). In other words, the setting control unit 28a changes the state of the accelerator associated with the server that has requested execution of the application "in use" state.

Further, in order to change the state of the accelerator associated with the server from the standby state to the in use state, the setting control unit 28a outputs an instruction to recover from the power saving mode to the corresponding accelerator (S109). Specifically, since power of the accelerator which is in the standby state is in an off state, the setting control unit 28a instructs the accelerator to turn on the power. For example, the setting control unit 28a outputs a WakeOn command to turn on the power.

Next, the setting control unit 28a generates an interrupt and outputs the interrupt to the processor of the server to which the slot is assigned and instructs the processor to execute HotAdd (S110). Thereafter, the setting control unit 28a outputs an application execution instruction to the server (S111).

Meanwhile, when it is determined in S106 that no accelerator which is in the standby state is present among the accelerators (No in S106), the setting control unit 28a returns to S103 and repeats step S3 and the subsequent process.

In addition, when it is determined that the corresponding accelerator does not remain mounted in the expansion I/O box 10 (No in S105), the setting control unit 28a does not assign the accelerator to the application, and outputs an application execution instruction (S111). Similarly, when it is determined that there is no corresponding accelerator (No in S103), the setting control unit 28a does not assign the accelerator to the application, and outputs an application execution instruction (S111). The process from S107 to S110 may be performed in a different order.

Concrete Example

Flow of System

Figure 6:
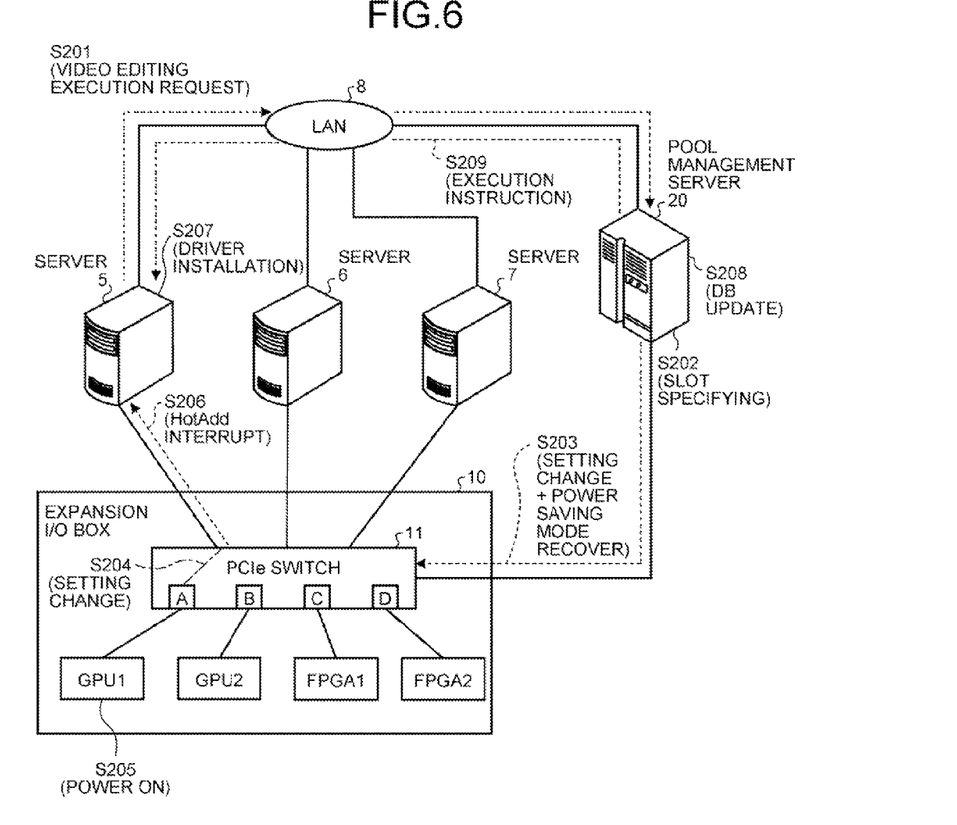
FIG. 6 is a diagram for describing an accelerator assignment process.

FIG. 6 is a diagram for describing the accelerator assignment process. As illustrated in FIG. 6, a system configuration diagram is the same as FIG. 1.

As illustrated in FIG. 6, the server 5 transmits an execution request of an application "video editing" to the pool management server 20 (S201). The setting control unit 28a of the pool management server 20 specifies the accelerator "GPU1" associated with "video editing," and further specifies the slot "slot A" in which "GPU1" is mounted (S202). Then, the setting control unit 28a of the pool management server 20 transmits a switch change instruction to associate the slot A with the server 5 and a recovery instruction to recover from the power saving mode to the expansion I/O box 10 (S203).

The PCIe switch 11 of the expansion I/O box 10 that has received the instructions changes a switching circuit or the like so that the server 5 can access the slot A (S204). Further, the GPU1 of the slot A turns its power on and is recovered from the power saving mode (S205).

The setting control unit 28a of the pool management server 20 transmits an instruction to output an interrupt of HotAdd to the PCIe switch 11, and the PCIe switch 11 causes the corresponding processor of the server 5 to execute HotAdd (S206).

Thus, the corresponding processor of the server 5 executes HotAdd, scans the accelerator of the PCIe switch 11, and installs a driver (S207).

Then, the setting control unit 28a of the pool management server 20 updates the state of the accelerator assigned to the server 5 from the "standby" state to the "in use" state in the accelerator mounting information DB (S208). Thereafter, the setting control unit 28a outputs an execution instruction of "video editing" to the server 5 (S209). As a result, the server 5 can execute the application "video editing" while using the GPU1 as the accelerator.

Accelerator Release Process

Next, an accelerator release process will be described with reference to FIGS. 7 and 8. Here, the flow of a process will be described using a flowchart and a system configuration diagram.

Flowchart

Figure 7:
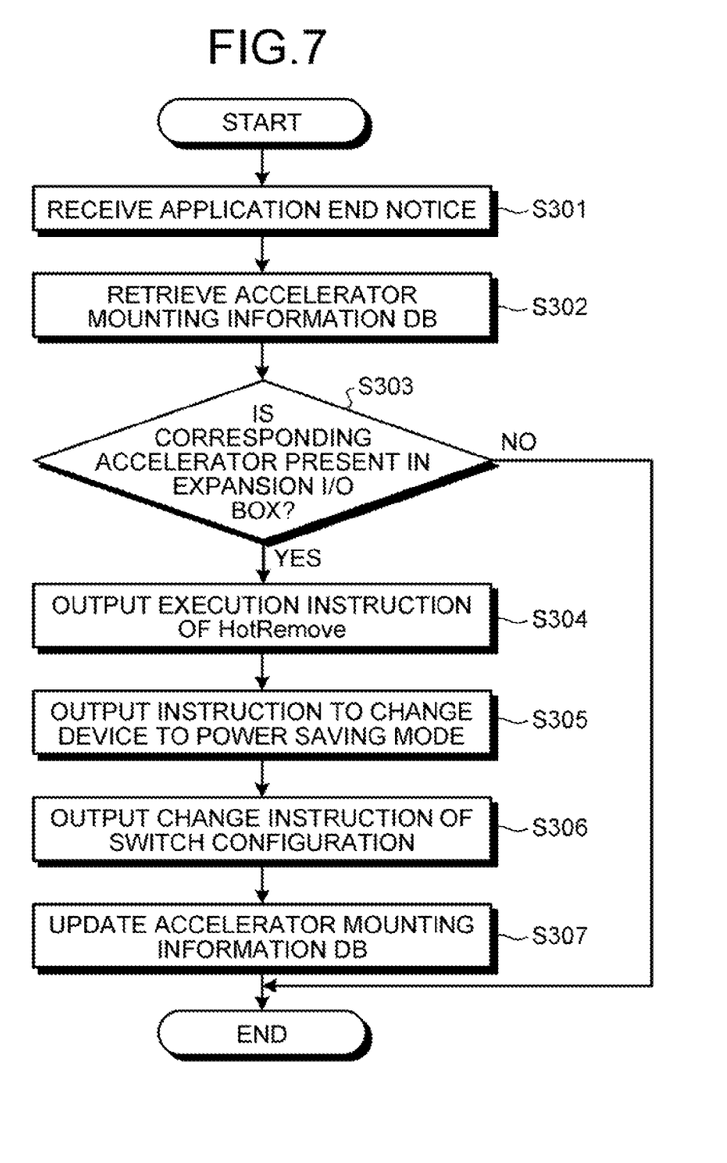
FIG. 7 is a flowchart illustrating the flow of an accelerator release process.

FIG. 7 is a flowchart illustrating the flow of the accelerator release process. As illustrated in FIG. 7, the release control unit 28b of the pool management server 20 receives an application end notice from the processor of the server 5 (S301).

Then, the release control unit 28b retrieves the accelerator mounting information DB 24 (S302), and determines whether or not the corresponding accelerator used by the application is present in the expansion I/O box 10 (S303). In other words, the release control unit 28b determines whether or not there is an in use accelerator.

Then, when it is determined that the corresponding accelerator is present in the expansion I/O box 10 (Yes in S303), the release control unit 28b generates an interrupt, outputs the interrupt to the processor of the server, and instructs the processor of the server to execute HotRemove (S304).

Next, the release control unit 28b outputs a transition instruction to enter the power saving mode to the accelerator in order to change the state of accelerator which is being used by the server from the in use state to the standby state (S305).

Then, the release control unit 28b outputs an instruction to change a configuration of a switch to the expansion I/O box 10 so that a connection between a slot in which the accelerator is mounted and the server that has requested execution of the application can be released (S306).

Thereafter, the release control unit 28b updates the accelerator mounting information DB 24 (S307). In other words, the release control unit 28b changes the state of the accelerator associated with the server that has requested execution of the application to the "standby" state.

However, when it is determined in S303 that no accelerator is present in the expansion I/O box 10 (No in S303), the release control unit 28b ends the process. The process of S304 to S307 may be performed in a different order.

Concrete Example

Flow of System

Figure 8:
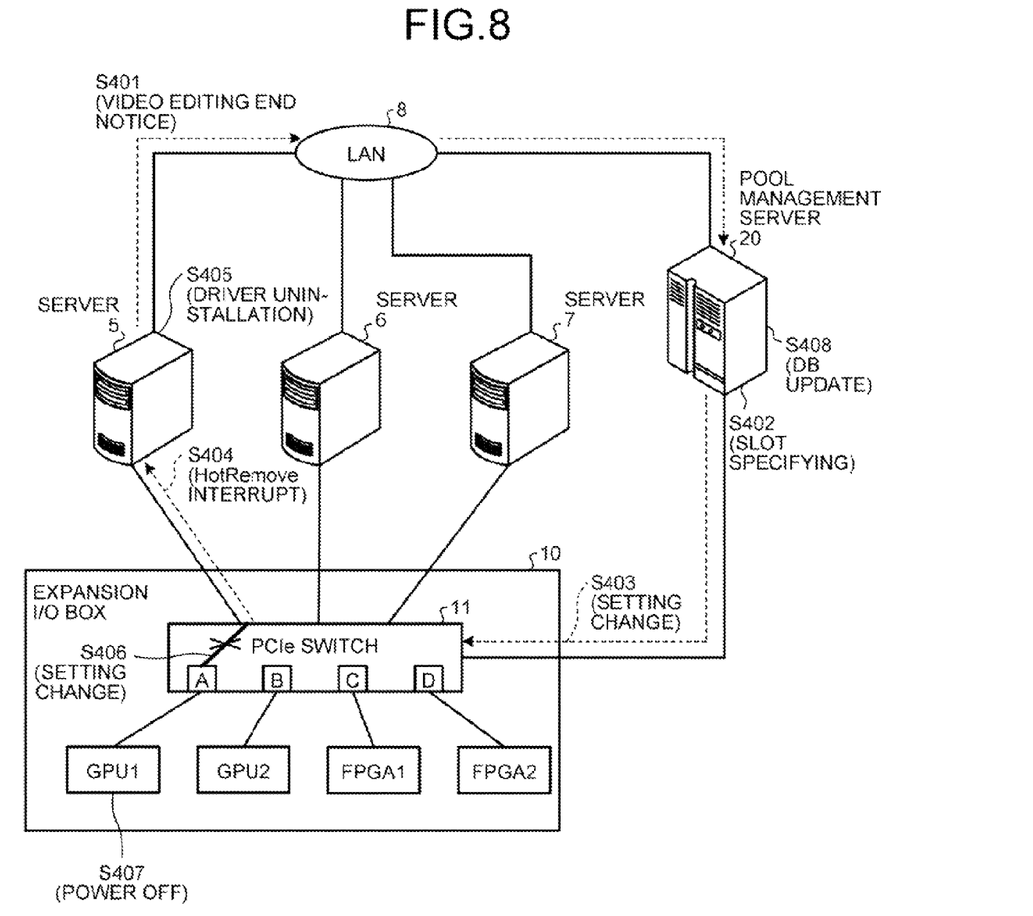
FIG. 8 is a diagram for describing an accelerator release process.

FIG. 8 is a diagram for describing the accelerator release process. As illustrated in FIG. 8, a system configuration diagram is the same as FIG. 1.

As illustrated in FIG. 8, the server 5 transmits an end notice of the application "video editing" to the pool management server 20 (S401). the release control unit 28b of the pool management server 20 specifies the accelerator "GPU1" associated with "video editing", and further specifies the slot "slot A" in which "GPU1" is mounted (S402).

Then, the release control unit 28b of the pool management server 20 transmits an instruction to release a correspondence between the server 5 and the slot A and a transition instruction to enter the power saving mode to the expansion I/O box 10, and the release control unit 28b performs setting change of the expansion I/O box 10 (S403).

Then, the PCIe switch 11 of the expansion I/O box 10 generates an interrupt, outputs the interrupt to the processor of the server 5, and causes the corresponding processor to execute HotRemove (S404). Then, the processor of the server 5 uninstalls the driver which is being used by the application whose execution has ended (S405).

In addition, the PCIe switch 11 changes a switching circuit or the like in order to prevent the server 5 from accessing the slot A (S406). Then, the GPU1 of the slot A turns its power off, and transitions to the power saving mode (S407).

Then, the setting control unit 28a of the pool management server 20 updates the state of the accelerator assigned to the server from the "in use" state to the "standby" state in the accelerator mounting information DB (S408). As a result, the server 5 can release the GPU1 together with the application "video editing."

As described above, the pool management server 20 can optimize an assignment by causing the accelerator to be connected or disconnected to the server in units of applications. In other words, the pool management server 20 can assign the accelerator when an application is executed and release an assignment of the accelerator when an application ends. As a result, the use efficiency of the processor of the server and the accelerator is improved. In addition, even when the server or the processor of the server is broken, influence on the accelerator can be localized.

[b] Second Embodiment

The embodiment of the present invention has been described so far, but beside the above-described embodiment, various different embodiments for embodying the present invention can be made. In the following, different embodiments will be described.

New Addition and Deletion of Accelerator

Figure 9:
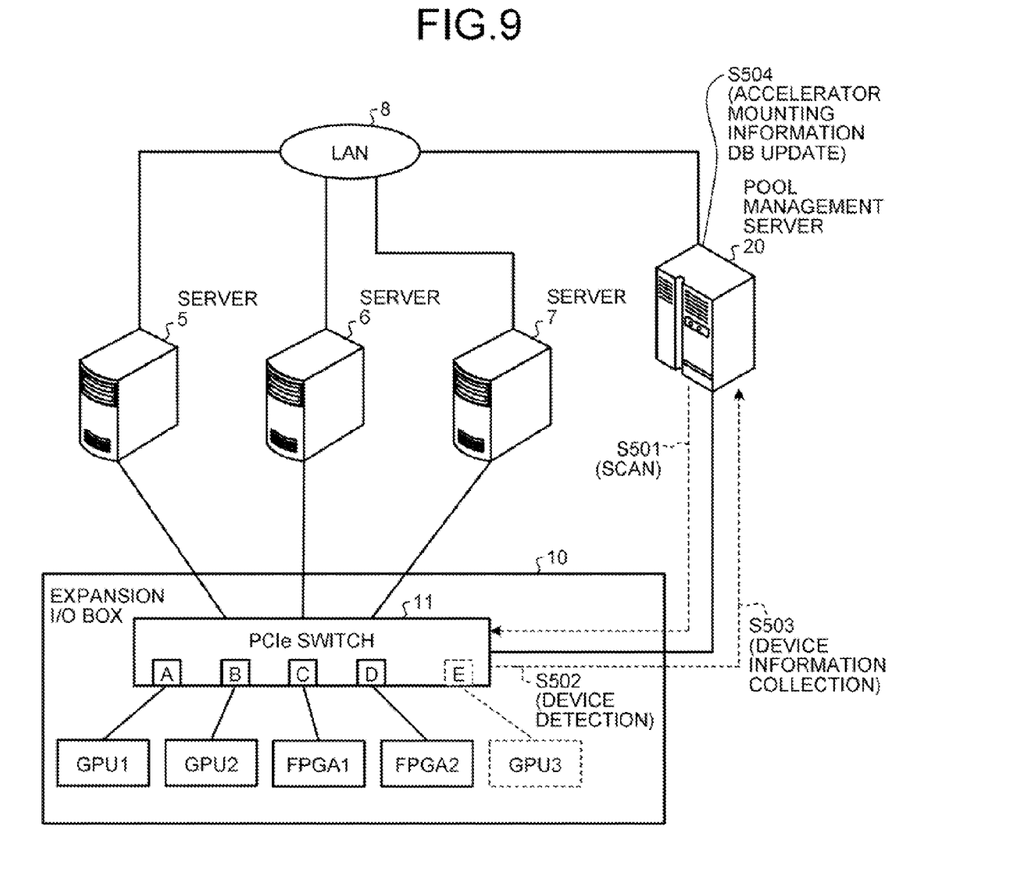
FIG. 9 is a diagram for describing new addition of an accelerator.

For example, the pool management server 20 can detect new addition or deletion of an accelerator by performing scanning the expansion I/O box 10 at regular intervals. FIG. 9 is a diagram for describing new addition of an accelerator. As illustrated in FIG. 9, a system configuration diagram is the same as FIG. 1.

As illustrated in FIG. 9, the scan executing unit 25 of the pool management server 20 scans the PCIe switch 11 of the expansion I/O box 10 (S501), and detects a new device which is newly connected to the PCIe switch 11 (S502). Then, the scan executing unit 25 collects information of the newly detected device (S503). For example, the scan executing unit 25 collects a vender type, a device type, a name of an accelerator, and the like. Here, the scan executing unit 25 detects that the GPU3 is mounted in the slot E.

Thereafter, the scan executing unit 25 generates an entry in which the slot E is associated with the GPU3 in the accelerator mounting information DB 24, and the scan executing unit 25 updates the accelerator mounting information DB 24 (S504). The pool management server 20 can detect a new device as described above.

In addition, the scan executing unit 25 can detect a deleted device by scanning the PCIe switch 11. For example, the scan executing unit 25 detects that no device is mounted in the slot C when the state of the accelerator mounting information DB 24 is the state of FIG. 4. Then, the scan executing unit 25 deletes an entry corresponding to the slot C from the accelerator mounting information DB 24. Thus, the scan executing unit 25 can stop an assignment to the deleted accelerator.

Expansion I/O Box

The first embodiment has been described in connection with an example in which the expansion I/O box 10 and the pool management server 20 are separated devices. However, the present invention is not limited to this example, and the expansion I/O box 10 and the pool management server 20 may be implemented in a single casing. For example, the PCIe switch 11 of the expansion I/O box 10 may have the same function as the pool management server 20. A processor that executes the same function as the pool management server 20 may be disposed in the expansion I/O box 10.

Accelerator Mounting Information

The first embodiment has been described in connection with the example in which the setting control unit 28a causes a correspondence between an application and an accelerator used by a corresponding application to be stored in a memory or the like, but the present invention is not limited to this example. For example, an application which is using an accelerator may be managed such that a column of "application" representing an application identifier of an in use application is disposed in the accelerator mounting information DB 24. Specifically, the setting control unit 28a causes an identifier of an application to which an accelerator is assigned to be stored in "application" when updating the state of the accelerator mounting information DB 24.

System

Further, in the process described in the present embodiment, all or part of the process described as being automatically performed may be manually performed. Further, all or part of the process described as being manually performed may be automatically performed by a known method. In addition, a processing procedure, a control procedure, a concrete name, or information including a variety of data or parameters illustrated in the specification or the drawings can be arbitrarily changed unless otherwise set forth.

In addition, the components of each device illustrated in the drawings are functionally conceptual and need not be necessarily physically configured as illustrated in the drawings. In other words, specific forms of dispersion/integration of the devices are not limited to the examples illustrated in the drawing. In other words, all or part thereof may be functionally or physically dispersed or integrated in arbitrary units depending on various loads or use conditions. Furthermore, all or any part of processing functions performed in each device may be implemented by a central processing unit (CPU) and a program analyzed and executed by the CPU, or may be implemented as hardware by wired logic.

Hardware Configuration

Meanwhile, various kinds of processes described in the above-described embodiments may be implemented by executing a program which is prepared in advance through a computer system such as a personal computer (PC) or a workstation. In this regard, in the following, an example of a computer that executes a program having the same function as in the above-described embodiments will be described.

Figure 10:
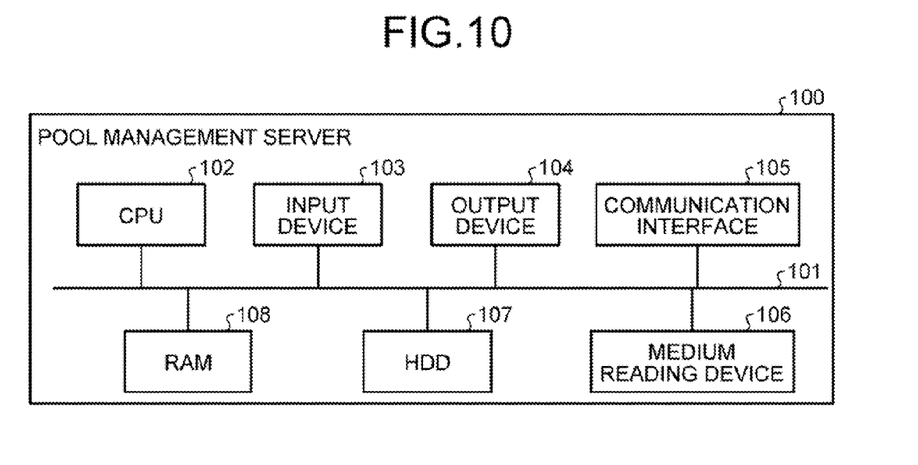
FIG. 10 is a diagram illustrating a hardware configuration example.

FIG. 10 is a diagram illustrating a hardware configuration example. As illustrated in FIG. 10, a pool management server 100 includes a CPU 102, an input device 103, an output device 104, a communication interface 105, a medium reading device 106, a hard disk drive (HDD) 107, and a random access memory (RAM) 108. The respective units illustrated in FIG. 8 are connected to each other through a bus 101.

The input device 103 includes a mouse or a keyboard, the output device 104 includes a display device or the like, and the communication interface 105 includes an interface such as a network interface card (NIC) or the like. The HDD 107 stores an accelerator management program and the tables and the like described in FIGS. 3 and 4. The HDD 107 has been described as an example of a recording medium, but various kinds of programs may be stored in a read only memory (ROM), a RAM, or a computer readable recording medium such as a compact disc read only memory (CD-ROM) and read by a computer. Further, a recording medium may be arranged at a remote site, and a program may be acquired and used such that a computer accesses the recording medium. At this time, the acquired program may be stored in a recording medium installed in the computer and used.

The CPU 102 operates an accelerator management process of executing each function described in FIG. 2 or the like by reading the accelerator management program and developing the accelerator management program in the RAM 108. In other words, the CPU 102 executes the scan executing unit 25, the accelerator specifying unit 26, the slot specifying unit 27, and the assignment control unit 28. As described above, the pool management server 100 reads and executes a program and thus operates as an information processing device that executes an accelerator management method.

Further, the pool management server 100 can implement the same function as in the above-described embodiments by reading the accelerator management program from the recording medium through the medium reading device 106 and executing the read accelerator management program. In this embodiment, a program is not limited to a program executed by the pool management server 100. For example, the present invention can be similarly applied even when another computer or a server executes a program or even when another computer or a server cooperatively executes a program.

It is possible to flexibly change an accelerator to be used by a host.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An accelerator management device, comprising:
   a first storage unit that stores an accelerator identifier used to identify an accelerator used by an application in association with an application identifier used to identify the application;
   a second storage unit that stores the accelerator identifier of the accelerator mounted in a slot in association with a slot identifier used to identify each slot of an expansion box in which a plurality of accelerators are mounted;
   a first specifying unit that specifies an accelerator identifier corresponding to an application by referring to the first storage unit when an execution request of the application is received from a host;
   a second specifying unit that specifies a slot identifier corresponding to the accelerator identifier specified by the first specifying unit by referring to the second storage unit; and
   an assignment control unit that assigns the slot that is identified through the slot identifier which is specified by the second specifying unit to the host.

2. The accelerator management device according to claim 1, wherein the assignment control unit makes a processor of the host to which the slot is assigned generate an interrupt of a recognition process to recognize an accelerator mounted in the assigned slot.

3. The accelerator management device according to claim 1, wherein when execution of an application that uses the accelerator completes, the assignment control unit makes a processor of the host to which the slot in which the accelerator is mounted is assigned generate an interrupt of a release process to release a use of the accelerator.

4. The accelerator management device according to claim 1, wherein the assignment control unit powers off an accelerator which is mounted in a slot that is not assigned to the host or an accelerator used by an application whose execution completes.

5. The accelerator management device according to claim 1, further comprising a correspondence generating unit that scans each slot of the expansion box, specifies an accelerator mounted in each slot, and stores a slot identifier of the scanned slot and an accelerator identifier of the accelerator specified by the scanning in the second storage unit in association with each other.

6. An accelerator management method comprising:
   specifying an accelerator identifier corresponding to an application by referring to a first storage unit that stores an accelerator identifier used to identify an accelerator used by the application in association with an application identifier used to identify the application when an execution request of the application is received from a host;
   specifying a slot identifier corresponding to the specified accelerator identifier by referring to a second storage unit that stores the accelerator identifier of the accelerator mounted in a slot in association with a slot identifier used to identify each slot of an expansion box in which a plurality of accelerators are mounted; and
   assigning a slot identified by the specified slot identifier to the host.

7. An input-output device comprising:
   a plurality of slots in each of which an accelerator is mounted;
   a first storage unit that stores an accelerator identifier used to identify an accelerator used by an application in association with an application identifier used to identify the application;
   a second storage unit that stores the accelerator identifier of the accelerator mounted in a slot in association with a slot identifier used to identify each slot in which the accelerator is mounted;
   a first specifying unit that specifies an accelerator identifier corresponding to an application by referring to the first storage unit when an execution request of the application is received from a host;
   a second specifying unit that specifies a slot identifier corresponding to the accelerator identifier specified by the first specifying unit by referring to the second storage unit; and
   an assignment control unit assigns the slot that is identified through the slot identifier which is specified by the second specifying unit to the host.

* * * * *